United States Patent
Lin et al.

(10) Patent No.: US 7,064,932 B1
(45) Date of Patent: Jun. 20, 2006

(54) HEAD STACK AND ACTUATOR ARM ASSEMBLIES AND DISK DRIVES HAVING AN ACTUATOR INCLUDING AN ACTUATOR ARM SPACER TO INCREASE ACTUATOR AND SUSPENSION STIFFNESS AND TO REDUCE THE NUMBER OF ACTUATOR ARM RESONANCE MODES

(75) Inventors: Chen-Chi Lin, San Jose, CA (US); Chunjer C. Cheng, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 193 days.

(21) Appl. No.: 10/306,984

(22) Filed: Nov. 27, 2002

(51) Int. Cl.
*G11B 5/55* (2006.01)
(52) U.S. Cl. ................................. 360/265.9
(58) Field of Classification Search ............. 360/265.7, 360/265.9, 266, 266.1

See application file for complete search history.

(56) References Cited

U.S. PATENT DOCUMENTS

| | | | | |
|---|---|---|---|---|
| 5,475,549 A | * | 12/1995 | Marder et al. | 360/265.8 |
| 5,666,243 A | * | 9/1997 | Brent | 360/265.9 |
| 5,864,444 A | * | 1/1999 | Baker et al. | 360/265.9 |
| 6,477,017 B1 | * | 11/2002 | Kohei et al. | 360/265.9 |
| 6,498,704 B1 | * | 12/2002 | Chessman et al. | 360/265.9 |
| 2002/0186511 A1 | | 12/2002 | Tsuda et al. | 360/265.9 |
| 2002/0186512 A1 | | 12/2002 | Kubotera et al. | 360/266 |

* cited by examiner

*Primary Examiner*—A. J. Heinz
(74) *Attorney, Agent, or Firm*—Alan W. Young, Esq.; Joshua C. Harrison, Esq.

(57) ABSTRACT

A disk drive includes a disk and a head stack assembly for reading and writing to the disk. The head stack assembly includes a body portion, a first actuator arm cantilevered from the body portion and a second actuator arm cantilevered from the body portion. A coil portion is cantilevered from the body portion in an opposite direction from the first and second actuator arms. An actuator arm spacer is disposed between the first and second actuator arms and away from the body portion, and mechanically links the first and second actuator arms.

35 Claims, 4 Drawing Sheets

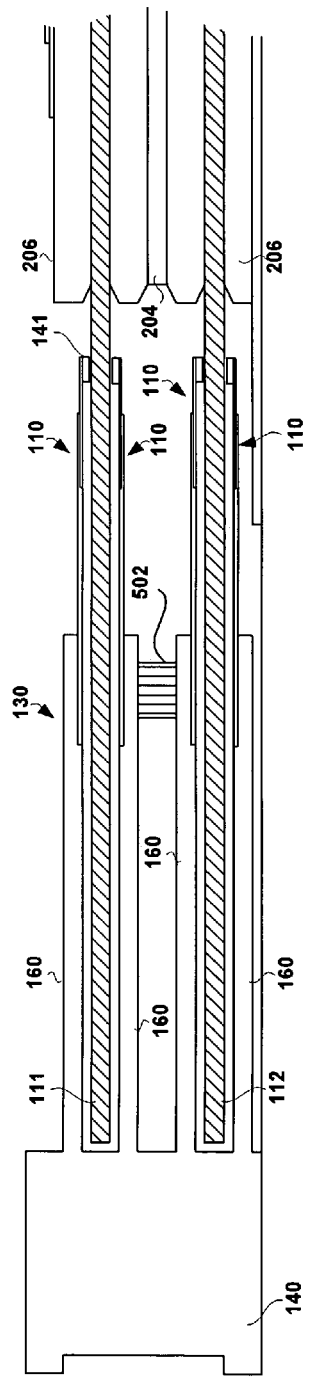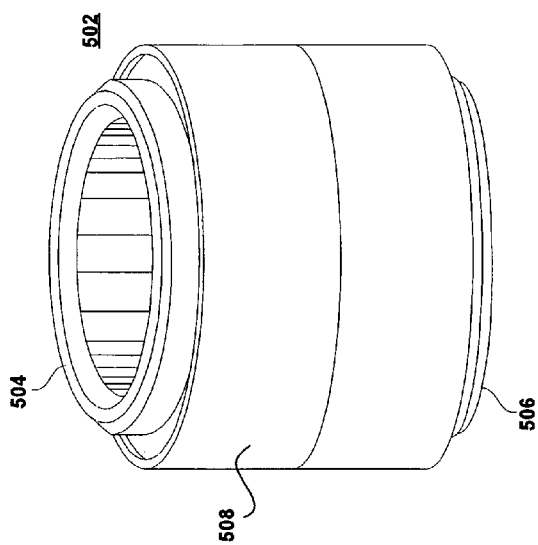
FIG. 5
FIG. 6

HEAD STACK AND ACTUATOR ARM ASSEMBLIES AND DISK DRIVES HAVING AN ACTUATOR INCLUDING AN ACTUATOR ARM SPACER TO INCREASE ACTUATOR AND SUSPENSION STIFFNESS AND TO REDUCE THE NUMBER OF ACTUATOR ARM RESONANCE MODES

BACKGROUND OF THE INVENTION

1. Field of the Invention

This invention relates to magnetic disk drives. More particularly, the present invention relates to disk drive head stack and actuator arm assemblies that include a balanced weight that mechanically link selected actuator arms to increase the stiffness of the actuator and suspension assemblies.

2. Description of the Prior Art and Related Information

Magnetic disk drives, such as those used for mass storage in personal computer systems are well known. Generally, disk drives include a head disk assembly (HDA) and a controller printed circuit board (PCBA). The HDA includes a cover, a base, one or more disks, a head stack assembly (HSA) that includes an actuator assembly, head gimbal assembly (HGA) and a flex circuit. The HSA rotatably positions a slider having one or more transducers over a disk. A spindle motor spins the disks. FIG. 2 is a simplified side view of a conventional head disk assembly 200. The head disk assembly 200 includes a HSA that includes an actuator assembly 230 and a HGA 210. The actuator assembly 230 includes a body portion 240, a plurality of actuator arms 260 (four such actuator arms 260 being shown in FIGS. 2, 3 and 4) cantilevered from the body portion 240. The actuator assembly 230 also includes a voice coil motor (VCM), which is not shown in FIGS. 2–4. The HSA is pivotally attached to the base of the drive 216. Each HGA 210 is attached to a respective actuator arm 260 and supports a slider, such as shown at 241. A plurality of disks (only two disks 211 and 212 are shown in FIGS. 2–4), are clamped to a spindle motor (not shown in FIGS. 2–4) and are separated by spacers 206. The head disk assembly 200 of FIG. 2 is a constituent element of a so-called "depopulated" drive. In a depopulated drive, one or more disks are removed and replaced with an additional spacer, as shown in FIG. 2 at reference numeral 204. The middle spacers 206, 204 and 206 may be combined into a single spacer. Although the head stack assembly is configured to read and write to as many as three disks (each with two recording surfaces), the HDA 200 of FIG. 2 has been configured to read and write to only two disks 211 and 212. The two middle actuator arms 260 do not require a full complement of two HGAs 210. These unnecessary HGAs 210 may, therefore, be omitted to save on fabrication and assembly costs. As each actuator arm 260 is configured to support two HGAs 210 on opposite faces thereof, the absence of an HGA 210 from one face unbalances the actuator arm 260. To compensate for such missing HGA 210, weights 202 are conventionally attached to and cantilevered from the actuator arms 260 from which a HGA 210 is missing. The weights 202 are configured so as to have the same or substantially the same mechanical properties as the missing HGAs 210, such that the overall mechanical characteristics of the HDA 200 are unchanged.

FIGS. 3 and 4 show the mode shapes of the HSA at two different frequencies, which may manifest themselves during normal operation of the drive or during a shock event. FIG. 3 illustrates the case wherein the HSA undergoes a first bending mode in which the middle two actuator arms 260 bend in the same direction. The motion of the two middle actuator arms 260 shown in FIG. 3 is an in-phase motion, in that the arms 260 bend in the same direction at or near the same time. The bending of the arms in FIGS. 3 and 4 has been vastly exaggerated to better illustrate the mode shapes and the problems inherent in conventional depopulated drives. This first in-phase bending mode has been observed in current generation drives at about 906 Hz. FIG. 4 shows the same HSA experiencing an out-of-phase first bending mode, in that the actuator arms are bending in opposite directions. This first out-of-phase bending mode has been observed at an excitation frequency of about 943 Hz. As the actuator arms 260 are not and cannot be made to be perfectly stiff, these bending modes occur as the actuator arms 260 bend in response to a given excitation frequency or frequency range. Stiffening the actuator arms 260, all other aspects thereof remaining the same, tends to beneficially increase the frequencies at which the arms 260 bend and tends to reduce the amplitude of such vibrations. The stiffer the actuator arms 260 can be made, the higher the frequencies will be at which the actuator arms 260 will bend.

Such bending and torsion modes interfere with the drive's reading and writing activities, and typically slow down the drive's seek time performance. To address such bending and torsion modes, a notch filter or filters tuned to the bending and the torsion modes frequencies may be used in the drive's servo to attenuate signals at these frequencies, to the detriment of available servo bandwidth. Moreover, it is easier to attenuate higher frequencies without unacceptable loss of signal amplitude, as it is to attenuate unwanted bending and torsion modes frequencies at comparatively lower frequencies. From the foregoing, it may be appreciated that there is a clear need for shifting the bending and torsion modes frequencies higher and/or to eliminate one or more bending and torsion modes of actuator arms of hard disk drives. Doing so would decrease drive seek times, decrease the degradation of servo bandwidth caused by such bending and torsion modes, among other benefits.

SUMMARY OF THE INVENTION

According to one aspect thereof, this invention may be regarded as a head stack assembly for a disk drive, comprising a body portion; a first actuator arm cantilevered from the body portion; a second actuator arm cantilevered from the body portion; an actuator arm spacer disposed between the first and second actuator arms and away from the body portion, the actuator arm spacer mechanically linking the first and second actuator arms, and a coil portion cantilevered from the body portion in an opposite direction from the first and second actuator arms.

The head stack assembly may further comprise a first suspension assembly coupled to the first actuator arm and a second suspension assembly coupled to the second actuator arm. The first suspension assembly has a first weight and the second suspension assembly has a second weight and the actuator arm spacer may have a weight that is about equal to the sum of the first and second weights. Each of the first and second weights may be about equal to the weight of the first suspension assembly. The actuator arm spacer may be attached to the first actuator arm and may be attached to the second actuator arm. The first and second actuator arms each have a free end that is furthest away from the body portion of the actuator assembly and the actuator arm spacer may be attached to the first and second actuator arms at or near the free ends thereof. The actuator arm spacer may be formed integral to the body portion and to the first and second actuator arms, or the actuator arm spacer may be a discrete element formed separately from the actuator body and from the first and second actuator arms. For example, the discrete actuator arm spacer may be attached to the first and second actuator arms by a swaging process. The discrete actuator arm spacer may define first and second neck portions having a first radius and a central portion having a second radius and disposed between the first and second neck portions, the first radius being smaller than the second radius to enable the first and second neck portions to be swaged onto the first and second actuator arms, respectively. The first actuator arm defines a first surface and the second actuator arm defines a second surface that faces the first surface. The actuator arm spacer may be attached to the first and second actuator arms between the first and second surfaces.

The present invention may also be viewed as a disk drive, comprising a disk; a head stack assembly for reading and writing to the disk, including: a body portion; a first actuator arm cantilevered from the body portion; a second actuator arm cantilevered from the body portion; an actuator arm spacer disposed between the first and second actuator arms and away from the body portion, the actuator arm spacer mechanically linking the first and second actuator arms, and a coil portion cantilevered from the body portion in an opposite direction from the first and second actuator arms.

The disk drive may further comprise a first suspension assembly coupled to the first actuator arm and a second suspension assembly coupled to the second actuator arm. The first suspension assembly has a first weight and the second suspension assembly has a second weight and the actuator arm spacer may have a weight that may be about equal to the sum of the first and second weights. Each of the first and second weights may be about equal to the weight of the first suspension assembly. The actuator arm spacer may be attached to the first actuator arm and to the second actuator arm. The first and second actuator arms each have a free end that is furthest away from the body portion and the actuator arm spacer may be attached to the first and second actuator arms at or near the free ends thereof. The actuator arm spacer may be formed integral to the body portion and to the first and second actuator arms. Alternatively, the actuator arm spacer may be a discrete element formed separately from the actuator body and from the first and second actuator arms. The discrete actuator arm spacer may be attached to the first and second actuator arms by a swaging process, for example. The discrete actuator arm spacer may define first and second neck portions having a first radius and a central portion having a second radius and disposed between the first and second neck portions, the first radius being smaller than the second radius to enable the first and second neck portions to be swaged onto the first and second actuator arms, respectively. The first actuator arm defines a first surface and the second actuator arm defines a second surface that faces the first surface, and the actuator arm spacer may be attached to the first and second actuator arms between the first and second surfaces.

BRIEF DESCRIPTION OF THE DRAWINGS

FIG. 5 shows a head disk assembly including an actuator arm spacer that mechanically links two of the actuator arms of the actuator arm assembly, according to an embodiment of the present invention.

FIG. 6 is a perspective view of an embodiment of a discrete actuator arm spacer, according to an embodiment of the present invention.

DESCRIPTION OF PREFERRED EMBODIMENTS

Figure 1:
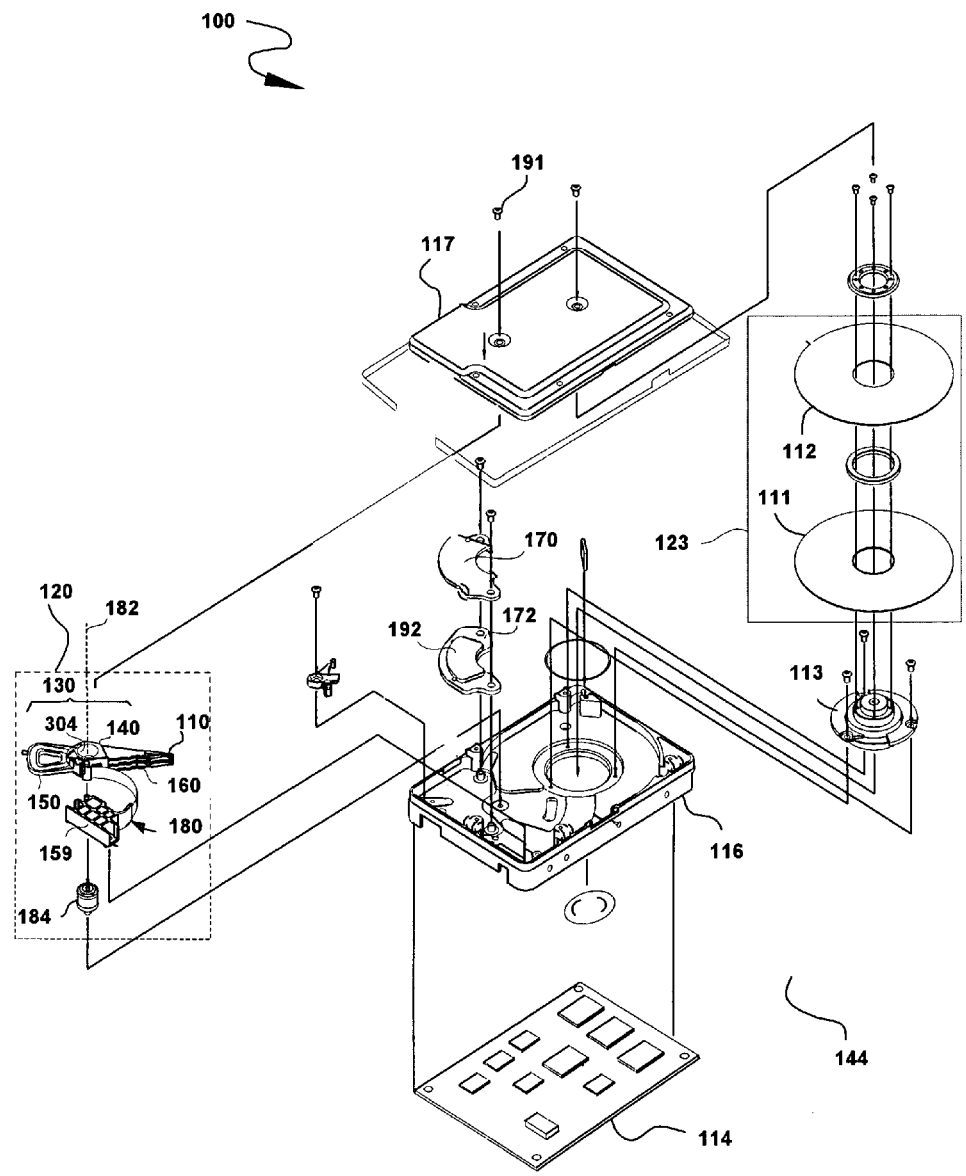
FIG. 1 is a diagram of the major components of a disk drive according to an embodiment of the present invention.

FIG. 1 shows the principal components of a magnetic disk drive 100 that incorporates aspects of the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111, and a second disk 112 are shown), a spindle motor 113 attached to the base 116 for rotating the disk stack 123, an HSA 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). At least one actuator arm 160 may be mechanically linked to another actuator arm 160 by an actuator arm spacer, in the manner described below and in reference to FIGS. 5–8. Each slider (shown at 141 in FIGS. 5, 7 and 8) includes read and write transducers for reading from and writing to the recording surface(s) of the disks 111, 112. The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

Figure 2:
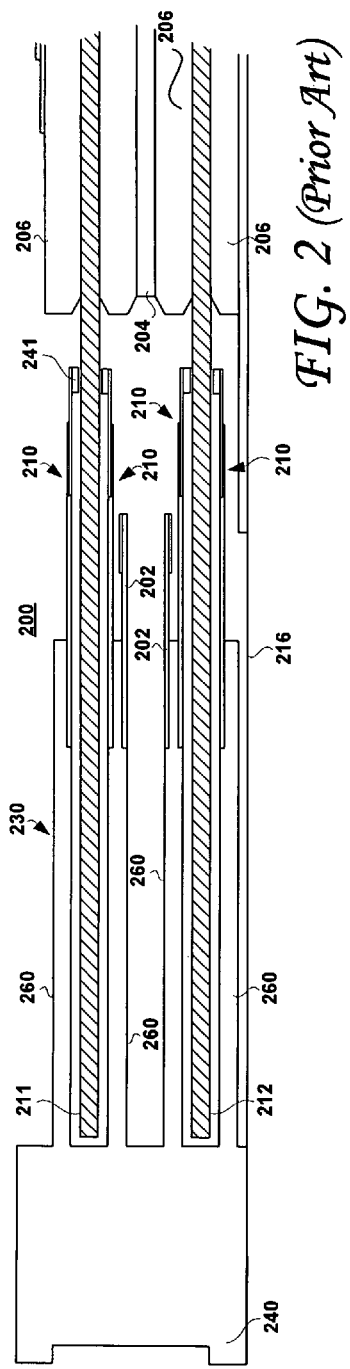
FIG. 2 is a simplified side view of a conventional depopulated head disk assembly.
Figure 3:
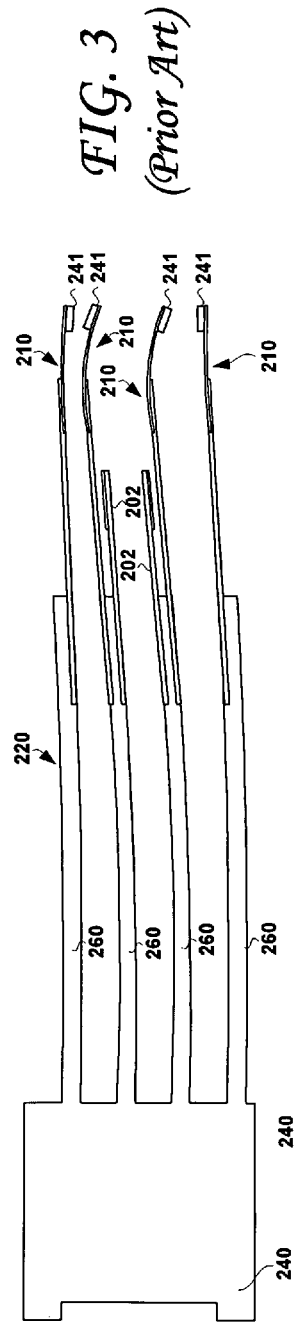
FIG. 3 shows the head stack assembly of the depopulated head disk assembly of FIG. 2, undergoing an in-phase first bending mode (the amplitude of the bending is exaggerated for illustrative purposes).
Figure 4:
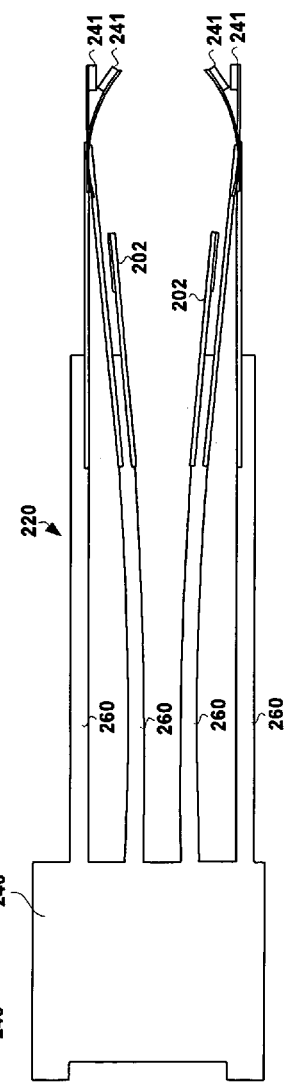
FIG. 4 shows the head stack assembly of the depopulated head disk assembly of FIG. 2, undergoing an out-of-phase first bending mode (the amplitude of bending is exaggerated for illustrative purposes).

FIG. 5 shows a head disk assembly according to an embodiment of the present invention. In FIG. 5, elements that find counterparts in FIG. 1 are identified by the same reference numeral. FIG. 5, therefore, shows an actuator assembly 130 including a plurality of actuator arms 160 cantilevered from the actuator body 140. The head disk assembly of FIG. 5 includes two disks 111 and 112, each of which may include two recording surfaces. HGAs 110 are attached to selected ones of the actuator arms 160, to enable the sliders 141 attached thereto to read and write to the recording surfaces of the disks 111, 112. In the exemplary embodiment of FIG. 5, a disk has been removed (or omitted) and has been replaced with an additional spacer 204 (which may be integrated with other spacer), as described relative to FIGS. 2, 3 and 4. As shown, the facing surfaces of the two middle actuator arms 160 do not include HGAs attached thereto. Moreover, unlike that shown in FIGS. 2, 3 and 4, the head disk assembly of FIG. 5 does not include individual weights cantilevered from the actuator arms that include only a single HGA 110.

Instead, the present invention calls for an actuator arm spacer 502 to be disposed between two of the actuator arms 160 of the HSA and away from the body portion 140. The actuator arm spacer 502 may be formed of or include aluminum and/or steel, for example. The actuator arm spacer 502, as shown in FIG. 5, mechanically links the actuator arms between which it is disposed. The actuator arm spacer 502 does not interfere with the functioning of the drive, as there is no disk in the space occupied by the spacer 502. Preferably, the weight of the actuator arm spacer 502 is equal to (or substantially equal to) the aggregate weight of the missing two suspension assemblies on the actuator arms to which the actuator arm spacer 502 is attached. The weight of the actuator arm spacer 502, therefore, is supported by two actuator arms 160, each arm supporting half of the weight of the actuator arm spacer 160. In this manner, the actuator arms 160 to which the actuator arm spacer 502 is attached remain balanced (and have the same or substantially the same inertia) as if the omitted suspension assemblies were, in fact, attached thereto. The actuator arm spacer 502 may be a discrete element that is attached to two of the actuator arms 160 of the actuator assembly. To maximize the stiffness of the actuator arms 160 to which the actuator arm spacer 502 is attached, the actuator arm spacer 502 is preferably attached at or near the free ends of the actuator arms. That is, the actuator arm spacer 502 is preferably attached to the actuator arms away from the body portion 140 and near the free ends of the actuator arms, in a manner that maximally increases the stiffness of the actuator arms 160 to which the actuator arm spacer 502 is attached. Placing the actuator arm spacer 502 closer to the actuator body portion 140 renders the actuator arms cantilevered again, thereby decreasing the stiffness thereof.

According to one embodiment of the present invention, the actuator arm spacer 502 is attached to the actuator arms 160 by the same swaging process that may be used to attach the suspension assemblies to the actuator arms. FIG. 6 is a perspective view of an actuator arm spacer 502 according to an embodiment of the present invention suitable to being attached to actuator arms 160 by a swaging process. As shown, the actuator arm spacer 502 defines first and second neck portions 504 and 506 having a first radius and a central portion 508 having a second radius. The central portion 508 is disposed between the first and second neck portions 504, 506. The first radius, that is, the radius of the neck portions 504 and 506, is smaller than the radius of the central portion 508. This enables the first and second neck portions 504, 506 to be swaged onto the actuator arms 160, respectively. Preferably, the actuator arm spacer 502 is aligned with the swaging through bores defined in the actuator arms. Thereafter, the suspension assemblies and the actuator arm spacer 502 may be swaged onto their respective actuator arms 160 by forcing a swage ball through the swaging through bores and through the actuator arm spacer 160, thereby attaching the suspension assemblies and the actuator arm spacer 502 to the actuator arms. The actuator arm spacer 502, therefore, defines an internal void that is at least sufficient large to enable the swaging ball to pass therethrough during the swaging process. It will be apparent to those of skill in this art that methods of attaching the actuator arm spacer 502 to the actuator arms 160 other than the aforementioned swaging process may be used. Moreover, although the actuator arm spacer 502 is shown as being generally cylindrical, it need not be. Indeed, the actuator arm spacer 502 may have other shapes, subject to manufacturing, ease of assembly and cost constraints.

Figure 7:
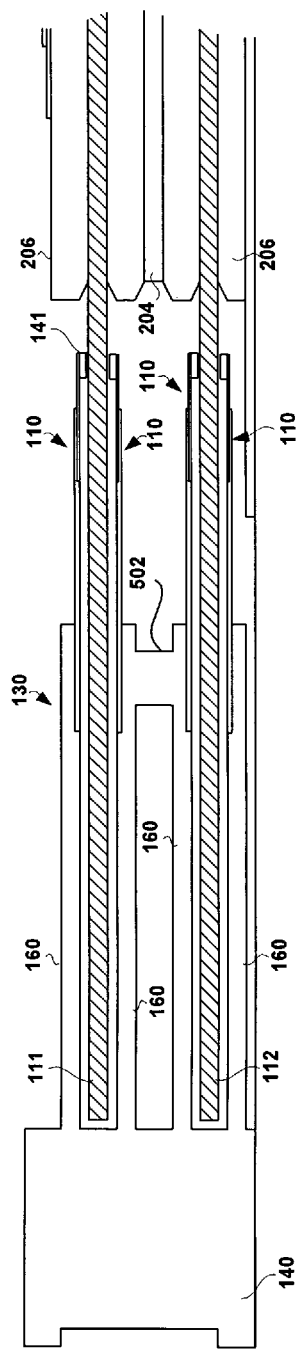
FIG. 7 shows a head disk assembly including an integral actuator arm spacer, according to another embodiment of the present invention.

The actuator arm spacer 502, however, need not be a discrete element that is formed separately from the actuator arms 160 and later attached thereto. Indeed, the actuator arms spacer 502 may be integrally formed (e.g., cast) with the body portion 140 and to the actuator arms 160, as shown in FIG. 7.

Figure 8:
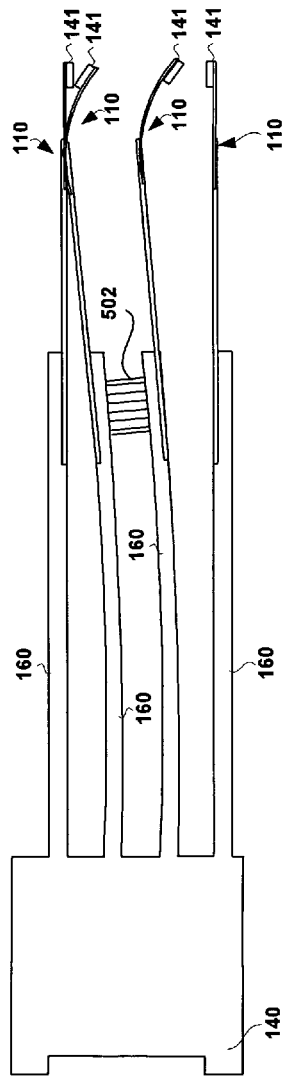
FIG. 8 shows the head stack assembly of the head disk assembly of FIG. 5, undergoing an in-phase first bending mode (amplitude of bending exaggerated for illustrative purposes).

FIG. 8 illustrates the in-phase first bending mode of a head stack assembly according to an embodiment of the present invention, in which the two middle actuator arms 160 are mechanically linked by an actuator arm spacer 502. The bending of the actuator arms 160 is greatly exaggerated to illustrate the motion imparted to the actuator arms when subjected to an excitation frequency that causes the in-phase first bending mode. It is to be noted that the present invention eliminates the out-of-phase first bending mode, as the linked actuator arms are mechanically tied together by the actuator arm spacer 502. Moreover, the in-phase first bending mode has been advantageously shifted to a higher frequency, relative to the frequency of about 943 Hz for the configuration shown in Prior Art FIG. 3. Advantageously, the modal frequency of the in-phase first bending mode for the actuator arms 160 of FIG. 8 is about 1,820 Hz, or about twice the frequency of the in-phase first bending mode illustrated in FIG. 3. Also, first torsion modes also only occur in-phase, and are shifted from about 7,000 Hz to above 10,000 Hz, further increasing the servo bandwidth, improving the depopulated drive's position error signal and decreasing access time.

To further stiffen the actuator arms, the actuator arms may define at least one through slot in the thickness thereof through which air can flow. In this manner, each through slot defines a slot surface that is generally perpendicular to the pivot axis. Such actuator arms and the benefits to be derived therefrom are disclosed in co-pending and commonly assigned application Ser. No. 10/306,978, filed Nov. 27, 2002, the disclosure of which is hereby incorporated by reference herein in its entirety.

Advantageously, the present invention eliminates a bending and a torsion mode of the actuator assembly, shifts the frequency of the first bending mode and the first torsion mode higher, improves the position error signal, servo bandwidth and drive seek time. Moreover, the first bending mode is the dominating mode that occurs during linear shock events. The present invention, therefore improves the drive's shock performance by increasing the frequency of the first arm bending mode.

We claim:

1. A head stack assembly for a disk drive, the head stack assembly defining a pivot axis and comprising:
   a body portion;
   a first actuator arm cantilevered from the body portion;
   a second actuator arm cantilevered from the body portion;
   an actuator arm spacer disposed between the first and second actuator arms and away from the body portion, the actuator arm spacer having an axis that is parallel to and offset from the pivot axis of the head stack assembly, the actuator arm spacer mechanically linking the first and second actuator arms, and
   a coil portion cantilevered from the body portion in an opposite direction from the first and second actuator arms,
   wherein the actuator arm spacer, the body portion, and the first and second actuator arms are a single part having material continuity rather than being an assembly of sub-parts.

2. The head stack assembly of claim 1, wherein the actuator arm spacer is attached to the first actuator arm and is attached to the second actuator arm.

3. The head stack assembly of claim 1, wherein the first and second actuator arms each have a free end that is furthest away from the body portion and wherein the actuator arm spacer is attached to the first and second actuator arms at or near the free ends thereof.

4. The head stack assembly of claim 1, wherein the first actuator arm defines a first surface and wherein the second actuator arm defines a second surface, the first surface facing the second surface, and wherein the actuator arm spacer is attached to the first and second actuator arms between the first and second surfaces.

5. A disk drive, comprising:
   a disk;
   a head stack assembly for reading and writing to the disk, the head stack assembly defining a pivot axis and including:
      a body portion;
      a first actuator arm cantilevered from the body portion;
      a second actuator arm cantilevered from the body portion;
      an actuator arm spacer disposed between the first and second actuator arms and away from the body portion, the actuator arm spacer having an axis that is parallel to and offset from the pivot axis of the head stack assembly, the actuator arm spacer mechanically linking the first and second actuator arms, and
   a coil portion cantilevered from the body portion in an opposite direction from the first and second actuator arms,
      wherein the actuator arm spacer, the body portion, and the first and second actuator arms are a single part having material continuity rather than being an assembly of sub-parts.

6. The disk drive of claim 5, wherein the actuator arm spacer is attached to the first actuator arm and is attached to the second actuator arm.

7. The disk drive of claim 5, wherein the first and second actuator arms each have a free end that is furthest away from the body portion and wherein the actuator arm spacer is attached to the first and second actuator arms at or near the free ends thereof.

8. The disk drive of claim 5, wherein the first actuator arm defines a first surface and wherein the second actuator arm defines a second surface, the first surface facing the second surface, and wherein the actuator arm spacer is attached to the first and second actuator arms between the first and second surfaces.

9. A head stack assembly for a disk drive, the head stack assembly comprising:
   a body portion;
   a first actuator arm cantilevered from the body portion;
   a first suspension assembly coupled to the first actuator arm, the first suspension assembly having a first weight;
   a second actuator arm cantilevered from the body portion;
   a second suspension assembly coupled to the second actuator arm, the second suspension assembly having a second weight;
   an actuator arm spacer disposed between the first and second actuator arms and away from the body portion, the actuator arm spacer mechanically linking the first and second actuator arms, the actuator arm spacer having a weight that is about equal to a sum of the first and second weights, and
   a coil portion cantilevered from the body portion in an opposite direction from the first and second actuator arms.

10. The head stack assembly of claim 9, wherein each of the first and second weights is about equal to a weight of the first suspension assembly.

11. The head stack assembly of claim 9, wherein the actuator arm spacer is attached to the first actuator arm and is attached to the second actuator arm.

12. The head stack assembly of claim 9, wherein the actuator arm spacer is attached to the first actuator arm and is attached to the second actuator arm.

13. The head stack assembly of claim 9, wherein the first and second actuator arms each have a free end that is furthest away from the body portion and wherein the actuator arm spacer is attached to the first and second actuator arms at or near the free ends thereof.

14. The head stack assembly of claim 9, wherein the actuator arm spacer is formed integral to the body portion and to the first and second actuator arms.

15. The head stack assembly of claim 9, wherein the actuator arm spacer is a discrete element that is formed separately from the actuator body and from the first and second actuator arms.

16. The bead stack assembly of claim 15, wherein the discrete actuator arm spacer is attached to the first and second actuator arms by a swaging process.

17. The head stack assembly of claim 16, wherein the discrete actuator arm spacer defines first and second neck portions having a first radius and a central portion having a second radius and disposed between the first and second neck portions, the first radius being smaller than the second radius to enable the first and second neck portions to be swaged onto the first and second actuator arms, respectively.

18. The head stack assembly of claim 9, wherein the first actuator arm defines a first surface and wherein the second actuator arm defines a second surface, the first surface facing the second surface, and wherein the actuator arm spacer is attached to the first and second actuator arms between the first and second surfaces.

19. A disk drive, comprising:
   a disk;
   a head stack assembly for reading and writing to the disk, including:

a body portion;

a first actuator arm cantilevered from the body portion;

a first suspension assembly coupled to the first actuator arm, the first suspension assembly having a first weight;

a second actuator arm cantilevered from the body portion;

a second suspension assembly coupled to the second actuator arm, the second suspension assembly having a second weight;

an actuator arm spacer disposed between the first and second actuator arms and away from the body portion, the actuator arm spacer mechanically linking the first and second actuator arms, the actuator arm spacer having a weight that is about equal to a sum of the first and second weights, and a coil portion cantilevered from the body portion in an opposite direction from the first and second actuator arms.

20. The disk drive of claim 19, wherein each of the first and second weights is about equal to a weight of the first suspension assembly.

21. The disk drive of claim 19, wherein the actuator arm spacer is attached to the first actuator arm and is attached to the second actuator arm.

22. The disk drive of claim 19, wherein the first and second actuator arms each have a free end that is furthest away from the body portion and wherein the actuator arm spacer is attached to the first and second actuator arms at or near the free ends thereof.

23. The disk drive of claim 19, wherein the actuator arm spacer is formed integral to the body portion and to the first and second actuator arms.

24. The disk drive of claim 19, wherein the actuator arm spacer is a discrete element that is formed separately from the actuator body and from the first and second actuator arms.

25. The disk drive of claim 24, wherein the discrete actuator arm spacer is attached to the first and second actuator arms by a swaging process.

26. The disk drive of claim 24, wherein the discrete actuator arm spacer defines first and second neck portions having a first radius and a central portion having a second radius and disposed between the first and second neck portions, the first radius being smaller than the second radius to enable the first and second neck portions to be swaged onto the first and second actuator arms, respectively.

27. The disk drive of claim 19, wherein the first actuator arm defines a first surface and wherein the second actuator arm defines a second surface, the first surface facing the second surface, and wherein the actuator arm spacer is attached to the first and second actuator arms between the first and second surfaces.

28. A head stack assembly for a disk drive, the head stack assembly comprising:

a body portion;

a first actuator arm cantilevered from the body portion;

a second actuator arm cantilevered from the body portion;

an actuator arm spacer disposed between the first and second actuator arms and away from the body portion, the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, the head stack assembly further comprising a first suspension assembly coupled to the first actuator arm and a second suspension assembly coupled to the second actuator arm and wherein the first suspension assembly has a first weight and the second suspension assembly has a second weight and wherein the actuator arm spacer has a weight that is about equal to a sum of the first and second weights.

29. The head stack assembly of claim 28, wherein each of the first and second weights is about equal to a weight of the first suspension assembly.

30. A head stack assembly for a disk drive, the head stack assembly comprising:

a body portion;

a first actuator arm cantilevered from the body portion;

a second actuator arm cantilevered from the body portion;

an actuator arm spacer disposed between the first and second actuator arms and away from the body portion, the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, wherein the discrete actuator arm spacer defines first and second neck portions having a first radius and a central portion having a second radius and disposed between the first and second neck portions, the first radius being smaller than the second radius to enable the first and second neck portions to be swaged onto the first and second actuator arms, respectively.

31. A head stack assembly for a disk drive, the head stack assembly comprising:

a body portion;

a first actuator arm cantilevered from the body portion;

a second actuator arm cantilevered from the body portion;

an actuator arm spacer disposed between the first and second actuator arms and away from the body portion the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, wherein the first actuator arm defines a first surface and wherein the second actuator arm defines a second surface, the first surface facing the second surface, and wherein the actuator arm spacer is attached to the first and second actuator arms between the first and second surfaces.

32. A disk drive, comprising:

a disk;

a head stack assembly for reading and writing to the disk, including:

a body portion;

a first actuator arm cantilevered from the body portion;

a second actuator arm cantilevered from the body portion;

an actuator arm spacer disposed between the first and second actuator arms and away from the body portion, the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, further comprising a first suspension assembly coupled to the first actuator arm and a second suspension assembly coupled to the second actuator arm and wherein the first suspension assembly has a first weight and the second suspension assembly has a second weight and wherein the actuator arm spacer has a weight that is about equal to a sum of the first and second weights.

33. The disk drive of claim 32, wherein each of the first and second weights is about equal to a weight of the first suspension assembly.

34. A disk drive, comprising:

a disk;

a head stack assembly for reading and writing to the disk, including:

a body portion;

a first actuator arm cantilevered from the body portion;

a second actuator arm cantilevered from the body portion;

an actuator arm spacer disposed between the first and second actuator arms and away from the body portion, the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, wherein the discrete actuator arm spacer defines first and second neck portions having a first radius and a central portion having a second radius and disposed between the first and second neck portions, the first radius being smaller than the second radius to enable the first and second neck portions to be swaged onto the first and second actuator arms, respectively.

35. A disk drive, comprising:

a disk;

a head stack assembly for reading and writing to the disk, including:

a body portion;

a first actuator arm cantilevered from the body portion;

a second actuator arm cantilevered from the body portion;

an actuator arm spacer disposed between the first and second actuator arms and away from the body portion, the actuator arm spacer mechanically linking the first and second actuator arms, the actuator arm spacer being a discrete element that is formed separately from the body portion and from the first and second actuator arms, the actuator arm spacer being attached to the first and second actuator arms by a swaging process, and a coil portion cantilevered from the body portion in an opposite direction from the first and second actuator arms, wherein the first actuator arm defines a first surface and wherein the second actuator arm defines a second surface, the first surface facing the second surface, and wherein the actuator arm spacer is attached to the first and second actuator arms between the first and second surfaces.

* * * * *

UNITED STATES PATENT AND TRADEMARK OFFICE
CERTIFICATE OF CORRECTION

| | | |
|---|---|---|
| PATENT NO. | : 7,064,932 B1 | Page 1 of 1 |
| APPLICATION NO. | : 10/306984 | |
| DATED | : June 20, 2006 | |
| INVENTOR(S) | : Chen-Chi Lin et al. | |

It is certified that error appears in the above-identified patent and that said Letters Patent is hereby corrected as shown below:

Col. 8, Line 48: Delete "bead" and insert --head-- therefor.

Signed and Sealed this

Thirtieth Day of January, 2007

JON W. DUDAS
*Director of the United States Patent and Trademark Office*